US008347210B2

(12) United States Patent
Ubillos et al.

(10) Patent No.: US 8,347,210 B2
(45) Date of Patent: Jan. 1, 2013

(54) SYNCHRONIZING VIDEO WITH AUDIO BEATS

(75) Inventors: Randy Ubillos, Los Altos, CA (US); Laurent Perrodin, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 535 days.

(21) Appl. No.: 12/563,704

(22) Filed: Sep. 21, 2009

(65) Prior Publication Data

US 2010/0080532 A1 Apr. 1, 2010

Related U.S. Application Data

(60) Provisional application No. 61/100,631, filed on Sep. 26, 2008.

(51) Int. Cl.
*G06F 3/00* (2006.01)
*G10F 1/12* (2006.01)

(52) U.S. Cl. .......................................... 715/716; 84/612

(58) Field of Classification Search .................. 715/716; 348/515; 84/612
See application file for complete search history.

(56) References Cited

U.S. PATENT DOCUMENTS

| 4,463,387 | A * | 7/1984 | Hashimoto et al. ............ 386/268 |
| 5,675,557 | A * | 10/1997 | Hubinger ............................ 369/4 |
| 6,018,121 | A * | 1/2000 | Devecka .......................... 84/743 |
| 7,301,092 | B1 * | 11/2007 | McNally et al. ................. 84/612 |
| 7,362,946 | B1 * | 4/2008 | Kowald ........................... 386/278 |
| 7,902,446 | B2 * | 3/2011 | Humphrey ................... 84/470 R |
| 8,006,186 | B2 * | 8/2011 | Kellock et al. ................. 715/728 |
| 2003/0146915 | A1 * | 8/2003 | Brook et al. ................... 345/473 |
| 2004/0254660 | A1 * | 12/2004 | Seefeldt ........................... 700/94 |
| 2006/0233055 | A1 * | 10/2006 | Hendrickson et al. ............ 369/1 |
| 2006/0259862 | A1 * | 11/2006 | Adams et al. ................. 715/716 |
| 2007/0236449 | A1 * | 10/2007 | Lacroix et al. ................. 345/156 |
| 2008/0016114 | A1 * | 1/2008 | Beauregard et al. ........ 707/104.1 |
| 2008/0097633 | A1 * | 4/2008 | Jochelson et al. .............. 700/94 |
| 2008/0188237 | A1 * | 8/2008 | Alles et al. .................. 455/456.1 |
| 2008/0232697 | A1 * | 9/2008 | Chen et al. ..................... 382/225 |
| 2009/0088877 | A1 * | 4/2009 | Terauchi et al. ................ 700/94 |
| 2009/0151546 | A1 * | 6/2009 | Reynolds et al. ............... 84/612 |
| 2009/0273712 | A1 * | 11/2009 | Landy ........................... 348/515 |

OTHER PUBLICATIONS

Lee, E., et al, "Toward a Framework for Interactive Systems to Conduct Digital Audio and Video Streams", Computer Music Journal, Spring 2006, vol. 30, Issue 1, pp. 21-36.*
Goto, M., et al, "A Beat Tracking System for Acoustic Signals of Music", Proceedings of the Second ACM International Conference on Multimedia, ISBN: 0-89791-686-7, 1994, pp. 365-372.*
Jehan, Tristan, et al, "Cati Dance: Self-Edited, Self-Synchronized Music Video", SIGGRAPH '03, ACM, 2003, pp. 1.*
Dixon, S., "Automatic extraction of tempo and beat from expressive performances," 2001, J. New Music Research 30(1):39-58.

* cited by examiner

*Primary Examiner* — Laurie Ries
(74) *Attorney, Agent, or Firm* — Kenyon & Kenyon LLP

(57) ABSTRACT

A computer-implemented method to synchronize video with beats in audio is described. Multiple video frames and multiple audio frames are displayed in a first and second bounded region, respectively, in a user interface. The multiple audio frames represent audio content that includes a periodic beat that is audible when the audio content is played. Input is received to associate one or more video frames with the multiple audio frames using a cursor. In response to the input, the first video frame is synchronized with a beat audio frame in the multiple audio frames. In response to a playback input, the first video frame is displayed in the user interface when the beat audio frame is played.

10 Claims, 11 Drawing Sheets

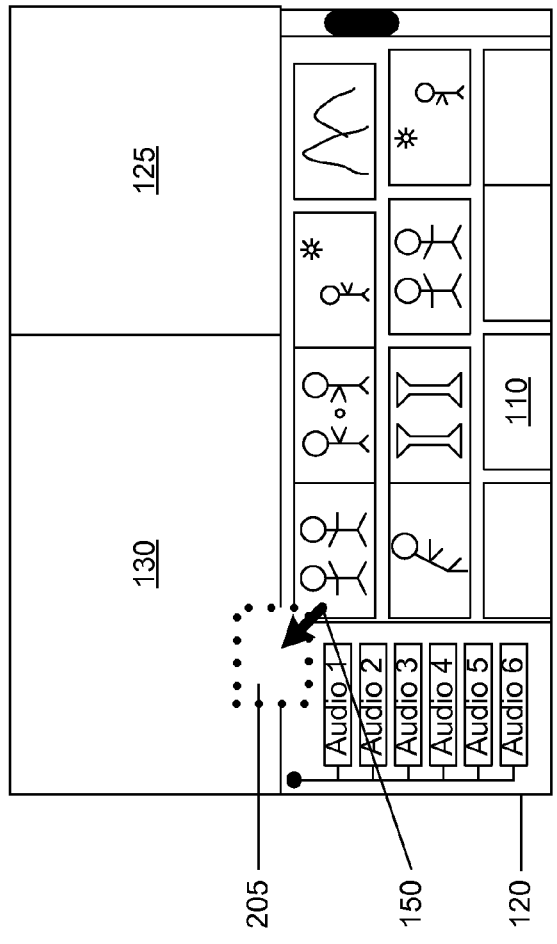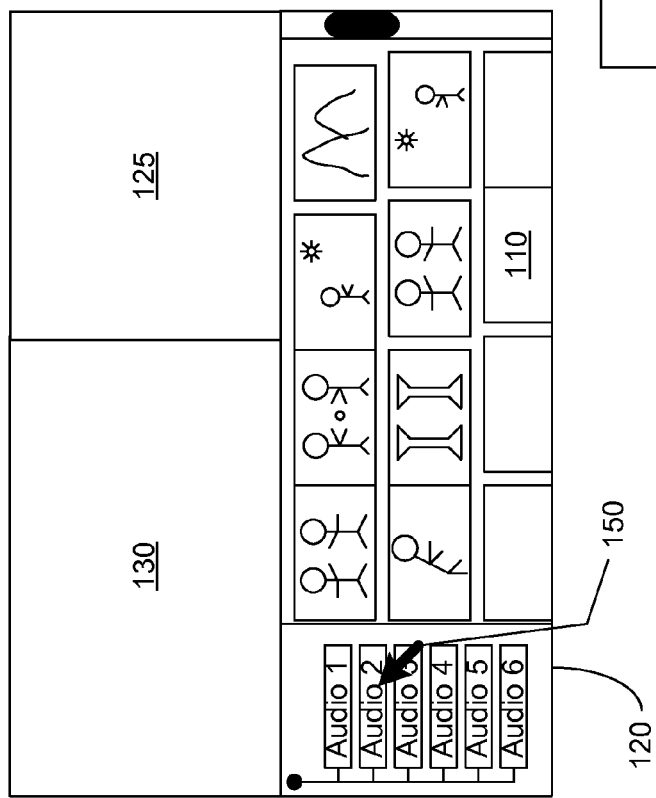

SYNCHRONIZING VIDEO WITH AUDIO BEATS

CROSS-REFERENCE TO RELATED APPLICATIONS

This application claims priority to U.S. Provisional Application Ser. No. 61/100,631, entitled "Synchronizing video with audio beats," filed on Sep. 26, 2008, the entire contents of which are incorporated herein by reference.

TECHNICAL FIELD

This specification relates to digital content management systems.

BACKGROUND

Digital recording equipment enables users to capture and store digital media content items, for example, video, images, audio, and the like. Software applications enable users to perform operations on the captured and stored digital media content. Such operations include viewing, editing, and the like. For video segments, a software application's editing operations can include deleting portions of the video segment, combining two or more video segments, overlaying content on a stored video segment, and the like. Some software applications allow users to associate audio with video content. After such associating, as the video content is played, the associated audio content is also played, e.g., as background music to the video content. Conversely, video content can be associated with audio such that the playback of interesting portions of the video is synchronized with playback of similarly interesting portions in the audio.

SUMMARY

This specification describes technologies relating to synchronizing video with periodic beats in audio. In one example, an audio-video content management system can visually represent audio content, e.g., a song, in a user interface as multiple rectangular bounded regions, each representing a portion of the audio content. The left and right edges of the rectangular bounded regions can represent consecutive beats in the song, that have been identified, e.g., using beat detection software, and provided to the system. In addition, the system can also visually represent video content in the user interface in one or more bounded regions. Using techniques described here, the system can synchronize a portion of displayed video content to a portion of audio content. To perform the synchronizing, the system can enable a user to select a portion of displayed video content and transfer the selected portion to the region of the user interface where the song is visually represented. In response, the system can synchronize a video frame in the transferred video content with an audio frame where a beat occurs such that when the system plays back the synchronized content, the instant when the video frame is played coincides with the instant when the beat in the song is heard.

In general, an innovative aspect of the invention can be implemented as a computer-implemented method in which a first bounded region representing multiple video frames is displayed in a first area of a user interface. A second bounded region representing multiple audio frames is displayed in a second area of the user interface. The multiple audio frames represent audio content that includes a beat that is audible when the audio content is played. Input is received to associate one or more video frames of the multiple video frames with the multiple audio frames. The input includes a positioning of the cursor over a portion of the first bounded region and over a portion of the second bounded region. In response to the received input, a first video frame of the one or more video frames is synchronized with a beat audio frame associated with the beat.

This, and other aspects, can include one or more of the following features. The beat audio frame can be included in the multiple audio frames such that in response to a playback input, the first video frame can be displayed in the user interface when the beat audio frame is played. The multiple audio frames can be provided to a beat detection system configured to identify the beat audio frame. The beat audio frame can be received from the beat detection system. A video frame of the multiple video frames can be associated with a first position of multiple first positions that collectively represent the horizontal dimension of the first bounded region. An audio frame of the multiple audio frames can be associated with a second position of multiple positions that collectively represent the horizontal dimension of the bounded region. Positioning the cursor over a first portion of the first bounded region can correspond to a selection of a video frame associated with that position. Positioning the cursor over a second portion of the second bounded region can correspond to a selection off an audio frame associated with the second position.

Another innovative aspect of the invention can be embodied in a computer-readable medium tangibly embodying a computer program product which when executed by one or more computers performs operations. The operations include displaying a bounded region representing audio content including multiple audio frames including to beat audio frames that represent two consecutive beats in the audio content. The bounded region is associated with a beat duration between the two beat audio frames. The operations include receiving multiple video frames representing video content to associate with the multiple audio frames. A video duration between a first video frame and a last video frame of the multiple video frames represents a duration of the video content. The operations include associating a first video frame in the video content to a first beat audio frame of the two beat audio frames to synchronize the video content and the audio content, and upon determining that a duration of the video content is less than or equal to the beat duration, displaying a video frame of the multiple video frames within the bounded region.

This, and other aspects, can include one or more of the following features. They left edge and a right edge of the bounded region can represent the two beat audio frames. The operations can further include receiving playback input to play the video content to which the audio content is synchronized. The operations include, in response to receiving playback input, playing back the audio content and the video content. The playing back can include displaying the video content within the bounded region while simultaneously playing the synchronized radio contact. The operations can also include, while playing back the audio content and the video content, displaying a vertical line spanning a vertical dimension of the bounded region over the video content. The operations can also include traversing the vertical line across the horizontal dimension of the bounded region such that when the audio content represented by the bounded region ends, the vertical line reaches a right age of the bounded region. The operations can further include providing the multiple audio frames to a beat detection system configured to identify the two beat audio frames, and receiving the two beat audio frames from the beat detection system.

Particular implementations of the subject matter described in this specification can be implemented to realize one or more of the following potential advantages. Visually displaying audio and video content in bounded regions in a user interface can simplify editing. Arranging the content in a sequence that is similar to one in which text is arranged in a text editor can enable the user to track the progress of the content during playback. Visually representing beats in an audio content and displaying a playhead over the visual representation of beats as the audio plays back can allow a user to identify occurrences of beats in the audio. Synchronizing audio and video content in response to actions representing a transfer of video content to the portion of the user interface where the audio content is displayed can simplify the synchronization process during editing. The single-step selection process can allow a user to quickly synchronize multiple portions of video content to multiple beats in the audio.

The details of one or more implementations of the specification are set forth in the accompanying drawings and the description below. Other features, aspects, and potential advantages of the specification will become apparent from the description, the drawings, and the claims.

BRIEF DESCRIPTION OF THE DRAWINGS

FIGS. 2A and 2B are examples of a user interface for displaying audio content as bounded regions.

Like reference numbers and designations in the various drawings indicate like elements.

DETAILED DESCRIPTION

Synchronizing digital audio content and digital video content includes associating the audio content and video content such that a frame in the video content is displayed in a display device at the same instant that a frame in the audio content is played. Most audio content, such as songs, portions of a song, and the like, include a beat, i.e., a pulse, that is played back at an approximately equally spaced rate. Each instance of the pulse being played back is defined as a beat. A duration of time between two consecutive beats is called a beat level. Thus, a song can be defined as including, e.g., 60 beats per minute with a beat level of 1 second (60 seconds/60 beats). The audio-video synchronization system described here provides visual representations of audio content, video content, and of the process of synchronizing frames in the video content to those audio frames that represent beats in the audio content.

Figure 1:
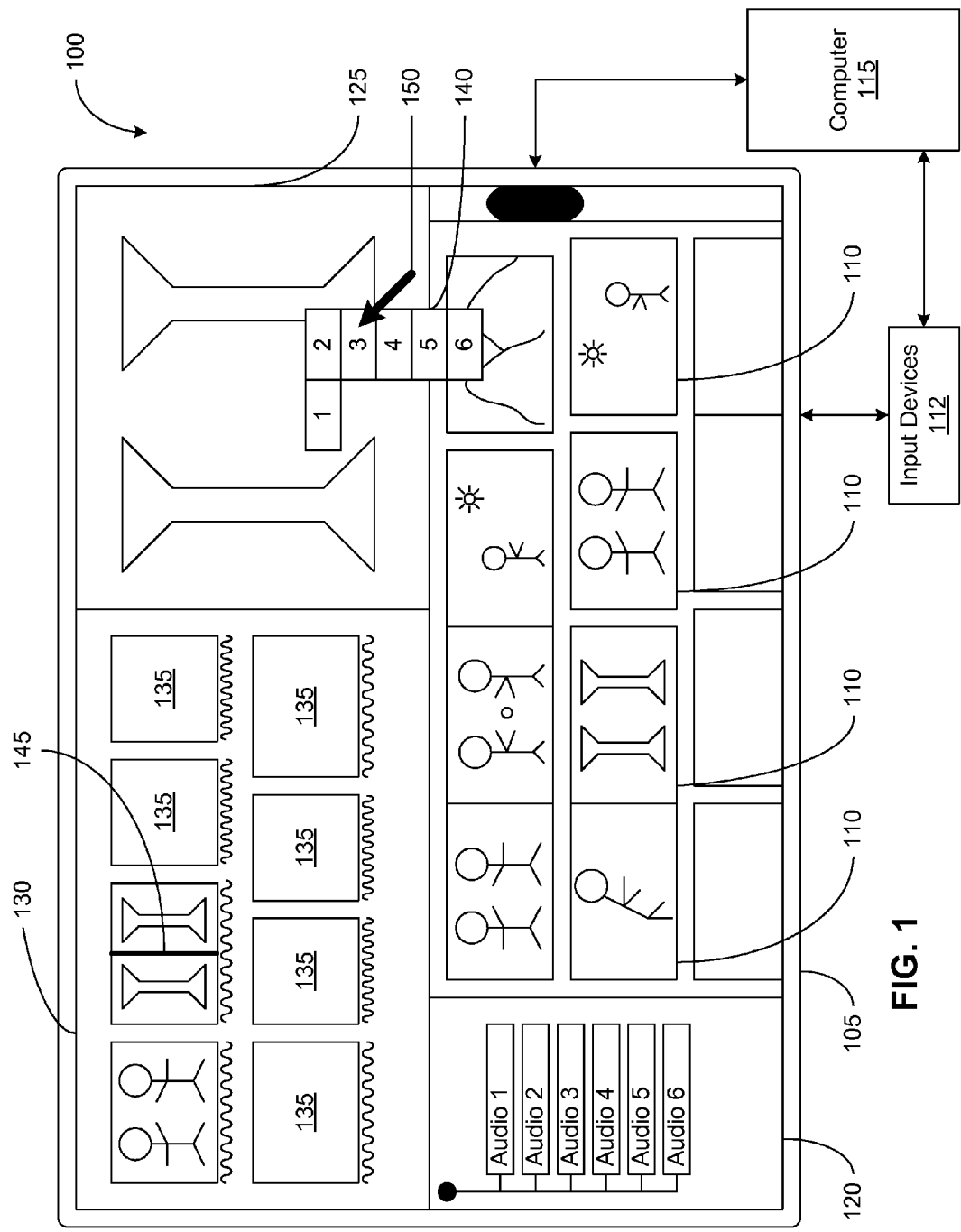
FIG. 1 is an example of a beat-based audio-video synchronization system.

FIG. 1 is an example of a beat-based audio-video synchronization system 100. The system 100 includes a display device 105, e.g., an LCD monitor, displaying a user interface in which digital content, e.g., audio content, video content, and the like, is displayed. In some implementations, the user interface is provided by an audio-video content management software application that includes instructions that are installed on a computer-readable medium which when executed by a computer 115 that is operatively coupled to the display device 105 cause the computer 115 to perform operations described as follows. The computer 115 receives input from a user of the system 100 through input devices 112, e.g., keyboard, mouse, stylus, and the like, operatively coupled to the computer 115, processes the input based on instructions encoded in the software application, and provides output. Such output includes displaying the effects of the input in the user interface in the display device 105 that is also operatively coupled to the computer 115.

In some implementations, a user can upload digital video content, e.g., an MPEG video file, a MOV video file, and the like, to the computer 115, and in response, the computer 115 can display the uploaded video content in the user interface. In addition, the computer 115 can play back and display the video content in a view pane 125 in the user interface. In an audio pane 120 in the user interface, the computer 115 can display digital audio content, e.g., MP3 audio files, WMA audio files, and the like, that is available for selection. In response to a user's selection of audio content, the computer 115 can provide the audio content to a beat detection system configured to identify beats in the audio content and to provide the identified beats to the computer 115. Upon receiving the beats in the audio content from the beat detection system, the computer 115 can visually represent the beats in a beats pane 130 in the user interface by displaying one or more beats as corresponding one or more beat regions 135. The left and right edges of a beat region 135 represent beat boundaries and the space between the edges of the beat region 135 represents a beat level, i.e., a time duration between the two beats represented by the edges of the beat region 135.

In some implementations, a user can select portions of the video content displayed in one or more thumbnails 110 and transfer the selected portions to the beats pane 130. In response, the computer 115 can synchronize a frame in each selected portion of the video content, e.g., the first frame, to a corresponding beat in the audio content. When the user views the selected portion that is displayed in the beats pane 130, the computer 115 can play back the video portion such that an instant when a first frame in each selected portion is displayed in the view pane 125 coincides with an instant when a beat, to which the frame in the selected portion is synchronized, is played back.

In some implementations, the computer 115 can allow a user to manually select a duration of video content to be synchronized with beats in the audio or can enable automatic selection of the duration using a beats panel 140 that will be described later. To provide visual assistance to follow the video content during playback, the computer 115 can display a playhead 145, e.g., a vertical line spanning a vertical dimension of a thumbnail, over the thumbnail including the video content that is being played back. When the user plays back video displayed in the beats pane 130, the computer 115 can display the playhead 145 over each beat region 135 that includes the video that is being played back. To select portions of video, audio, and other features, the computer 115 can display a pointer 150, e.g., a mouse cursor, that is controlled using the input devices 112. The above-described features and additional features of the computer 115 executing instructions based on the audio-video content management software application will be described with reference to the figures that follow.

FIGS. 2A and 2B are examples of a user interface for displaying audio content as bounded regions. The user interface illustrated in FIGS. 2A and 2B have multiple portions including a portion to display video content, an audio pane 120, a view pane 125, a beats pane 130. Additional or fewer panes can be displayed in the user interface, e.g., in response to user input. Also, the panes can be located anywhere in the user interface. Further, two panes may share a common edge. Alternatively, each pane may be separated by a distance from another pane or one pane may overlap another pane. Furthermore, the positions of any pane in the user interface can be altered by user input.

FIG. 2A is an example of a default state of the user interface in which the audio content has not yet been transferred to the beats pane 130. In the example user interface illustrated in FIG. 2A, the audio content, i.e., multiple audio files, are represented in the audio pane 120 in respective bounded regions titled "Audio 1," "Audio 2," and so on. In alternative implementations, each audio file can be displayed in the audio pane 120 as corresponding audio thumbnails. The audio files can be stored in a computer-readable medium, e.g., a hard disk, a flash storage device, and the like, that is operatively coupled to the computer 115 via wired or wireless means. In some implementations, when the computer 115 launches the software application, the computer 115 can automatically search for audio files and display the audio files in the audio pane. Similarly, the computer 115 can automatically search for video content, i.e., multiple video clips, that are stored on a computer-readable medium, e.g., a hard disk, a USB device, a CD-ROM, and the like, and display the video clips across one or more thumbnails 130. Alternatively, the user can select one or more audio files and one or more video files for display in the user interface.

When a user wishes to upload an audio file into the beats pane 130, the user can select a representation of the audio file, e.g., the bounded region in which "Audio 1" is displayed, in the audio pane 120 and transfer the bounded region to the beats pane 130. To do so, the user can select the bounded region in the audio pane 120 using the pointer 150. In response to the user selecting an audio file, the computer 115 can display a rectangular bounded region 205, as illustrated in FIG. 2B. The computer 115 ties the rectangular bounded region 205 to the pointer 150 such that the bounded region 205 moves wherever the pointer 150 moves at least as long as the selection of the input device continues. Using the input devices 112, the user places the bounded region 205 in the beats pane 130.

For example, the user controls the pointer 150 using a mouse. The user positions the pointer 150 on the representation of an audio file of choice in the audio pane 120 and clicks the mouse to select the audio file. The computer 115 detects this selection of the audio file and displays the bounded region 205. With the mouse button depressed, the user moves the bounded region 205 over the beats pane 130 and releases the mouse. Alternatively, the user can position the pointer 150 over the audio file and double-click the audio file. The computer 115 detects this selection and transfers the selected audio file to the beats pane 130. The computer 115 provides the audio file to the beats detection system that identifies the beats in the audio file and provides the beats to the computer 115.

Figure 3:
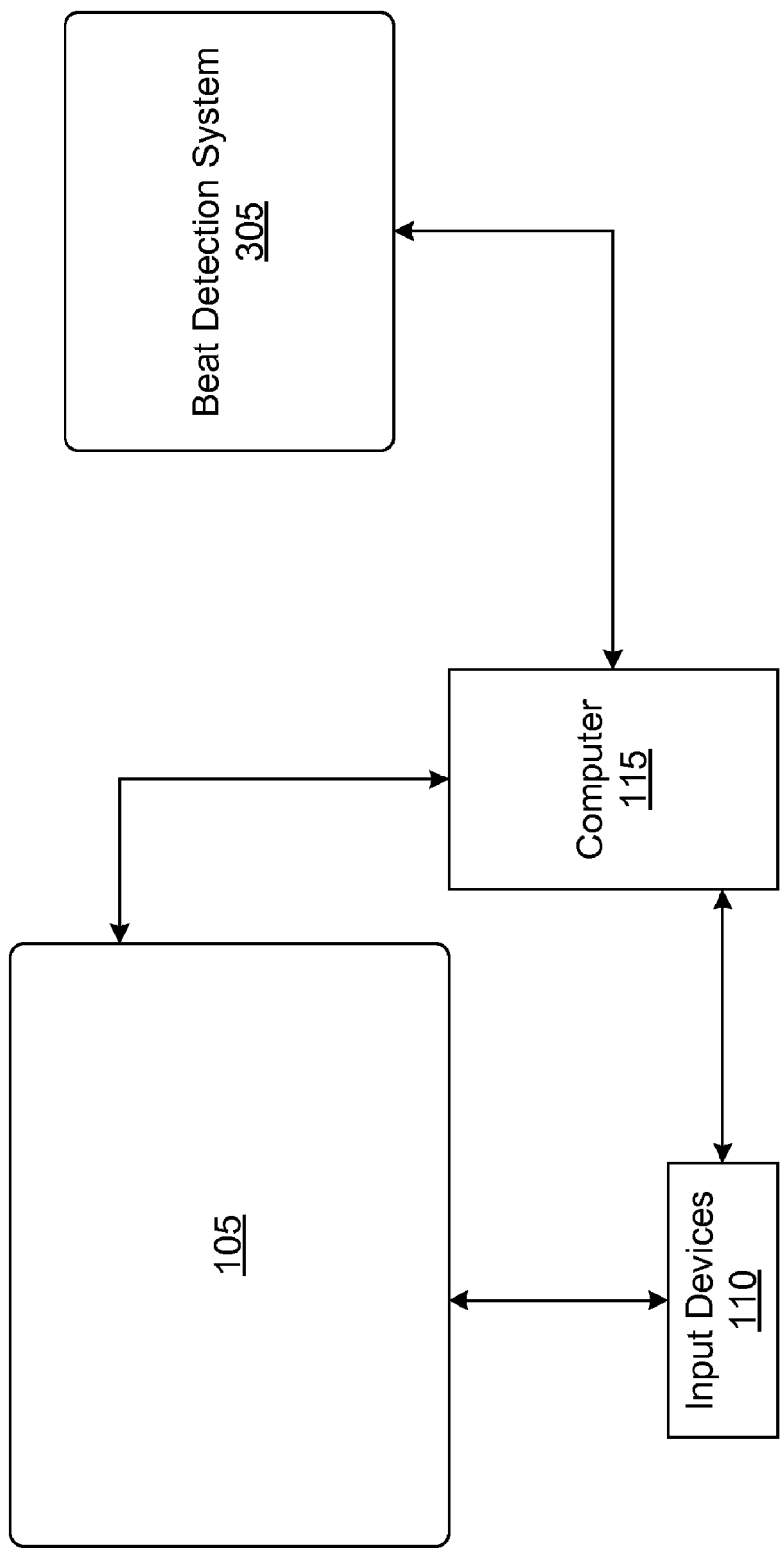
FIG. 3 is an example of a beat detection system operatively coupled to the beat-based audio-video synchronization system.

FIG. 3 is an example of a beat detection system 305 operatively coupled to the beat-based audio-video synchronization system 100. The beat detection system 305 is configured to receive an audio file, e.g., the selected audio content, from the computer 115, and extract the beats in the audio content. The beat detection system 305 can employ several known techniques for beat detection, e.g., the technique described in the publication titled "Automatic extraction of tempo and beat from expressive performances," *J. New Music Rsrch.*, 2001, 30, 39-58.

In some implementations, the computer 115 provides a selected digital audio content including audio frames to the beat detection system 305. The beat detection system 305 determines information about the beats in the audio content, e.g., a number of beats, a beat level, and the like, and provides the identified information to the computer 115. To identify beats, the beat detection system 305 can identify audio frames in the audio content where beats occur. Such audio frames are called beat audio frames. Upon receiving information about the beats from the beat detection system 305, the computer 115 displays the beat regions 135, representing beats in the selected audio file, in the beats pane 130, as illustrated in FIG. 4.

Figure 4:
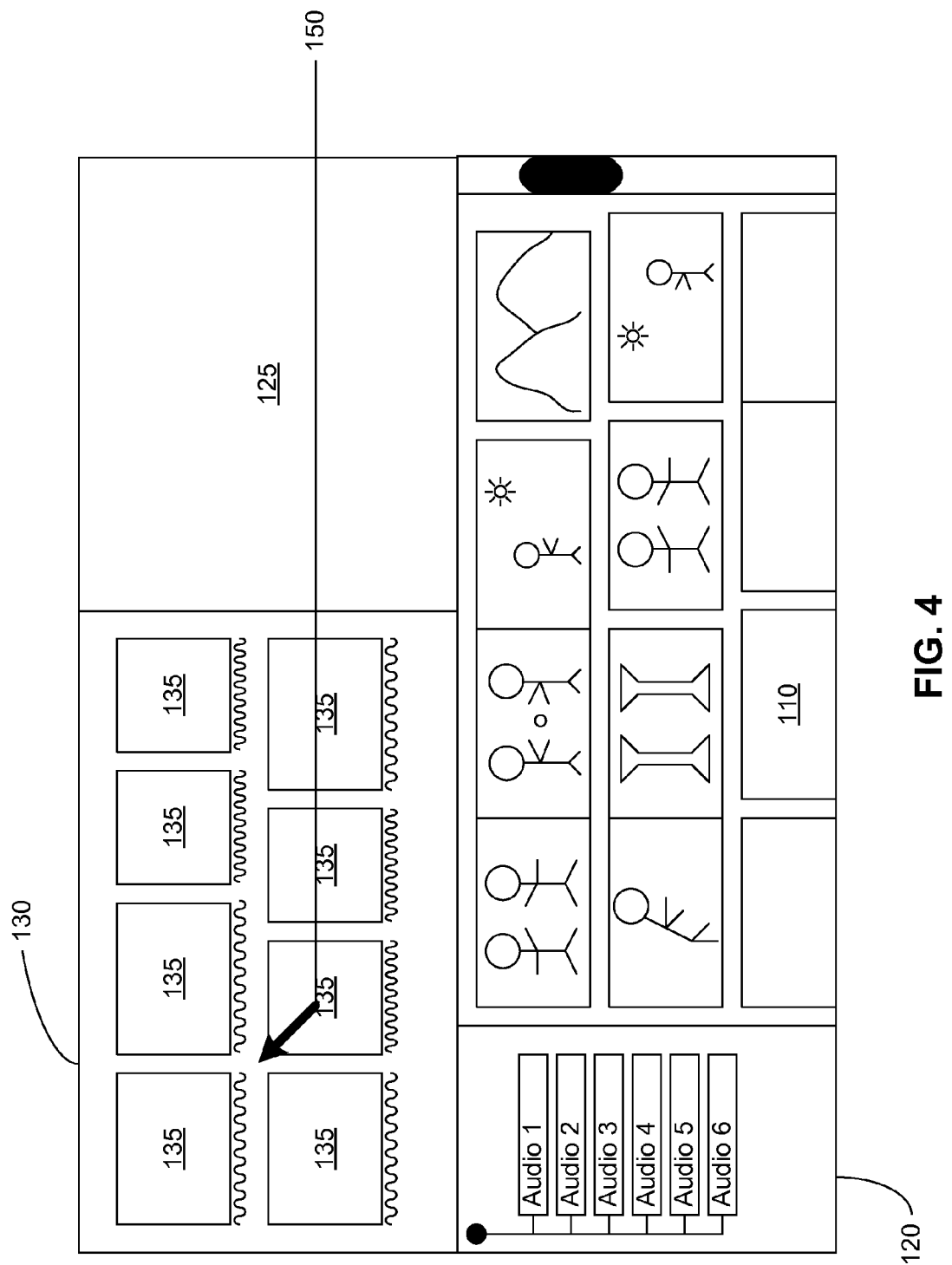
FIG. 4 is an example of a user interface including a beats pane displaying beat regions representing beats.

FIG. 4 is an example of a user interface including a beats pane 130 displaying beat regions 135 representing beats. In some implementations, the beat regions 135 are rectangular and each rectangular region represents a fraction of the total number of audio frames in the audio file. The left and right edges of a beat region 135 each represent the audio frame in the audio file when the beat occurs, called the beat audio frame, and the horizontal distance between the left and right edges represents a beat level, i.e., a time duration between two beat audio frames. In some scenarios, the beat levels for the audio content are uniform meaning that the beats occur throughout the audio content at equal intervals of time. In such scenarios, a number of audio frames between every two consecutive beat audio frames are equal. Further, in such scenarios, the horizontal dimensions of the beat regions 135 displayed in the beats pane 130 are equal to one another. Alternatively, the beat levels can be non-uniform, and a number of frames between a set of beat audio frames are different from a number of frames between any other set of beat audio frames. Furthermore, the horizontal dimensions of each beat region 135 are also different from each other.

In some scenarios, each beat region 135 represents a beat and the edges of each beat region 135 represents beat audio frames. Such scenarios can occur when the audio content, e.g., the song, begins on a beat and the beat detection system 305 identifies the first beat at the instant that the song begins to play. However, not all songs begin on a beat, and the first beat in the song may occur a few seconds after the song has played. The beat detection system 305 can provide information to the computer 115 identifying the first beat in the song and a duration of time or a number of audio frames or both from the beginning of the song at which instant the first beat occurs. In such scenarios, the computer 115 can represent the first few audio frames of the audio content until the first beat occurs as a first beat region 135. Thus, the second beat region 135 in the first row can represent the first beat in the song. In alternative implementations, the computer 115 can position the first beat region 135 in the first row at a distance from the left edge of the beats pane 130. While this distance represents the first few audio frames of the audio content, the absence of a bounded region is an indication to the user that there are no beats in that portion of the audio content.

To display beat regions 135 representing beats, in some implementations, the computer 115 can store, e.g., on a computer-readable medium, a table including beat levels and horizontal dimensions. The horizontal dimension can represent a number of pixels on the display device 105 within a region occupied by the beats pane 135. In addition to receiving a beat level from the beat detection system 305, the computer 115 also receives each beat audio frame. Subsequently, the computer 115 identifies a horizontal dimension that corresponds to the beat level from the computer-readable medium and displays a beat region 135 having the identified horizontal dimension in the beats pane 135, e.g., by displaying a line in the display device 105 spanning a number of pixels that corresponds to the horizontal dimension. In this manner, the computer 115 compares beat levels received from the beat detection system 305 with horizontal dimensions in the table stored in the computer-readable medium and displays beat regions 135 based on the table.

A number of bounded regions that the computer 115 displays can correspond to a number of beats received from the beat detection system 305. In some scenarios, the computer 115 can display fewer than a number of beats received from the beat detection system 305 depending, e.g., on space availability in the beats pane 130 or user selection or both. In addition, the computer 115 can display in the user interface, indicia representing the audio frames between two beat audio frames represented by the two edges of a beat region 135. In some implementations, the computer 115 can display the indicia, e.g., a line having a wave form, adjacent the bottom edge of and outside the beat region 135. Alternatively, any other indicia can be used.

The beat regions 135 representing beat levels are positioned adjacent to each other in a row. When a sequence of bounded regions are arranged starting from the left edge of the beats pane 130, and the right edge is reached, then the subsequent beat region 135 is displayed in a row vertically displaced from the first row, e.g., below the first row, adjacent to the left edge of the beats pane 130. In this manner, the computer 115 can arrange the beat regions 135 in the beats pane 130 until all beat regions 135 available for display are displayed. A sequence in which the beat regions 135 are arranged from the left edge to the right edge of the beats pane 130 and then in rows from the top edge to the bottom edge of the beats pane 130 corresponds to the progress of time in the audio content from the beginning to the end. Thus, subsequent to arrangement, the first few seconds of the audio content correspond to the first few beat regions 135 in the first row adjacent the left edge while the last few seconds of the audio file correspond to the last few beat regions 135 in the last row.

In some implementations, the computer 115 can allow a user to visually track a progress of playback of the audio file that the user has uploaded into the beats pane 130. To do so, the computer 115 can initially display the playhead 145 on the left edge of the left-most beat region 135 on the first row of the beats pane 130. When the audio playback commences, the computer 115 can traverse the playhead 145 from the left edge to the right edge of the beats pane 130. When the playhead 145 reaches the right edge of the last beat region 135 in the first row, the computer 115 can hide the playhead 145 from the first row and can display the playhead 145 on the left edge of the left-most beat region 135 on the second row of the beats pane 130. Thus, as the audio frames in the audio content play back, the playhead 145 traverses the beats pane 130 from the first beat region 135 in the first row to the last beat region 135 in the last row until the audio content ends or is stopped by the user.

The rate at which the playhead 145 traverses the rows of beat regions 135 depends on factors including a number of audio frames, a number of beats in the audio content, beat levels, and a horizontal dimension of the beat region 135 representing a beat level. The computer 115 can move the playhead 145 such that the position of the playhead 145 coincides with a position of a left edge of each beat region 135 every time the beat occurs in the audio content. In some implementations, to do so, the computer 115 can first display the playhead 145 on the left edge of a beat region 135. Because each beat region 135 occupies multiple pixels and because each beat region 135 represents multiple audio frames, the computer 115 can associate one or more audio frames in a beat region 135 to one or more pixels that are arranged in a horizontal line spanning the horizontal dimension of the beat region 135 in the display device 105. When the playhead 145 traverses the beat region 135, the computer 115 can display the playhead 145 at a pixel when the audio frame corresponding to the pixel plays. This offers an appearance to a user that the playhead 145 is moving in sync with the audio content.

For example, if three adjacent beat regions 135 arranged, e.g., from left to right, correspond to three beats in the audio content, then when the first beat audio frame is played back, the playhead 145 coincides with the left edge of the left-most of the beat regions 135, namely the first beat region 135. For the duration of the beat level between the first and second beat, the playhead 145 traverses the first beat region. As the beat level expires, the playhead 145 arrives at the right edge of the first beat region 135. When the second beat audio frame is played, the playhead 145 is hidden from the first beat region 135 and positioned on the left edge of the second beat region 135. Then, the playhead 145 continues to traverse towards the right edge of the second beat region 135, and then to the third beat region 135. The beat regions 135 need not be limited to three and need not be arranged in the same row. Rather, the computer 115 can traverse the playhead 145 across the audio content that is displayed across any number of beat regions 135 spanning any number of rows.

In scenarios where the beat levels are uniform, the horizontal dimensions of all the beat regions 135 are equal. In such scenarios, the speeds at which the playhead 145 traverses the rows of beat regions 135 in the beats pane are the same for each row. If two beat regions 135 having the same horizontal dimension represent different beat levels and/or two beat regions representing the same beat level having different horizontal dimensions, then the speeds of the playhead 145 traversing each of the beat regions 135 vary. Such scenarios are possible when video content is added to the beats pane 130 as will be described later as well as when the beat detection system 305 determines that the audio content has more than one beat level.

In some implementations, the computer 115 can automatically consolidate multiple beats into a single beat region 135 based on a number of beats received from the beat detection system 135. For example, when the computer 115 receives the number of beats and the audio frame associated with each beat, the computer 115 can compare the total number of beats received with a threshold stored on a computer-readable medium. If the number of beats is greater than the threshold, then the computer 115 can consolidate beats. In another example, a default value that represents a number of beats to be consolidated into a single beat region 135 can be preset in the computer 115, e.g., stored in a computer-readable medium as part of instructions provided by the software application. When the computer receives information about the beats from the beat detection system 305, the computer 115 can consolidate the default value of beats into a single beat region 135. In some implementations, the default value can be altered in response to user input. To consolidate, e.g., two beats into one beat region 135, the computer 115 can identify the first and third beat audio frame, associate the first beat audio frame with a left edge of the beat region 135 and the third beat audio frame with a right edge of the beat region 135. In addition, the computer 115 can associate the horizontal dimension of the beat region with the duration of audio between the first and the third beat audio frames. The computer 115 can consolidate more than two beats into a single beat region 135 using similar methods.

In some implementations, the computer 115 can decimate a single beat region 135 into multiple beat regions 135, where each of the multiple beat regions 135 represents a fraction, e.g., ¼, ½, ⅓, of the beat represented by the single beat region. In some implementations, the computer 115 can display each of the multiple decimated beat regions as having horizontal dimension that is equal to that of the decimated beat region. Alternatively, the computer 115 can display each of the multiple decimated beat regions as having a horizontal dimension that is less than the single beat region 135. The computer 115 can traverse the playhead 145 across the multiple beat regions based on the fraction into which the single beat region 135 is decimated.

Figure 5A:
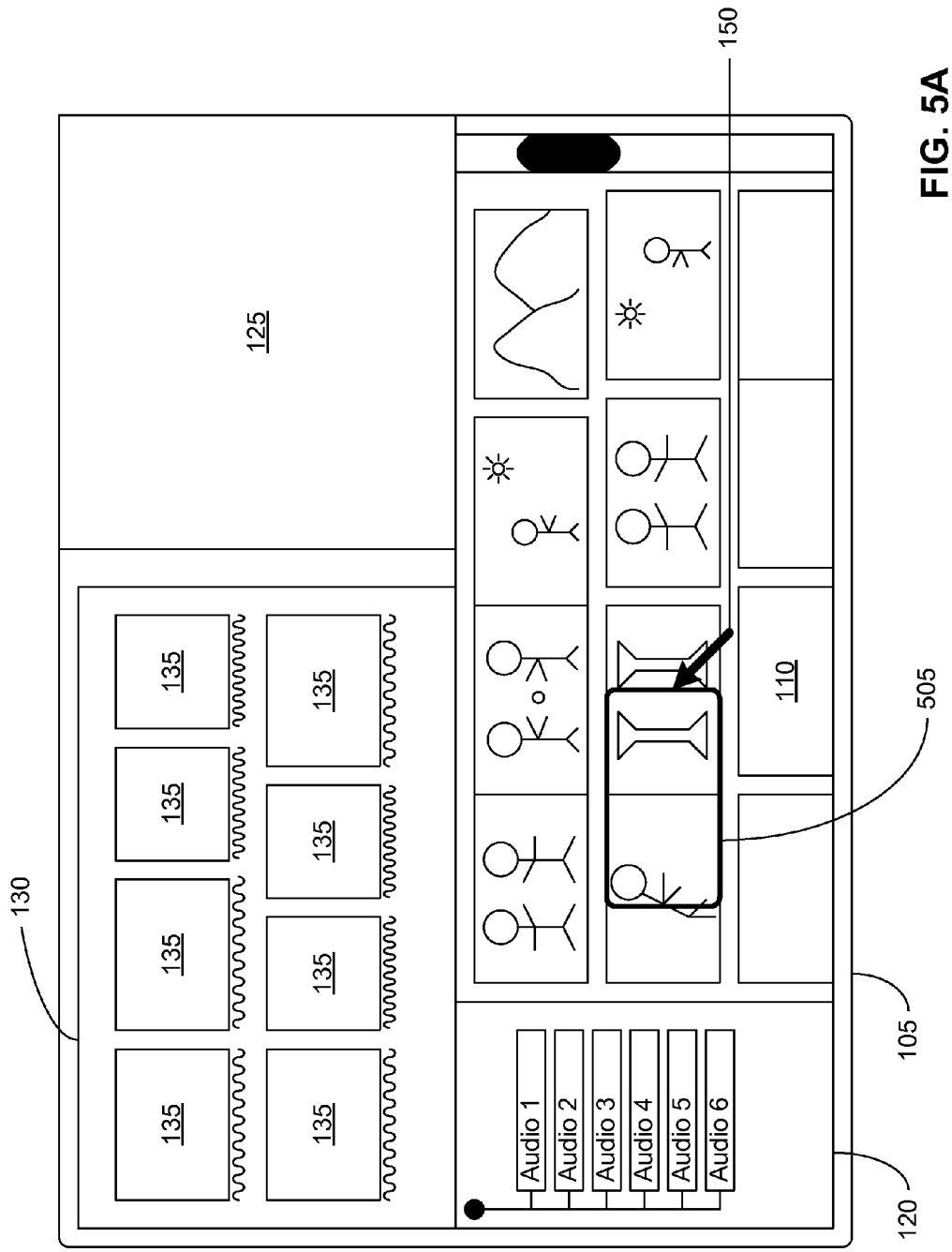
FIGS. 5A-5C are examples of a user interface for transferring portions of video content to the beats pane.
Figure 5B:
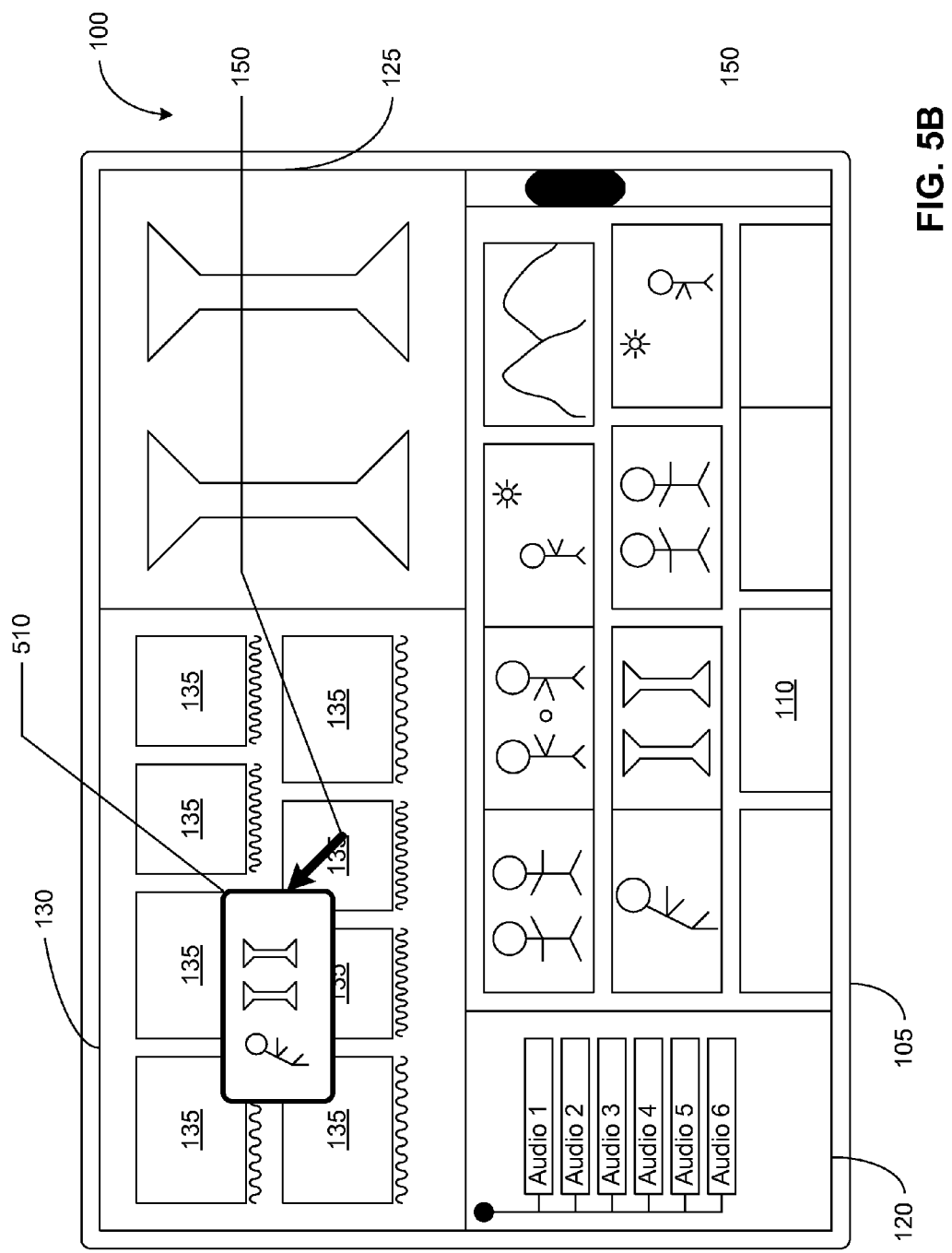
Figure 5C:
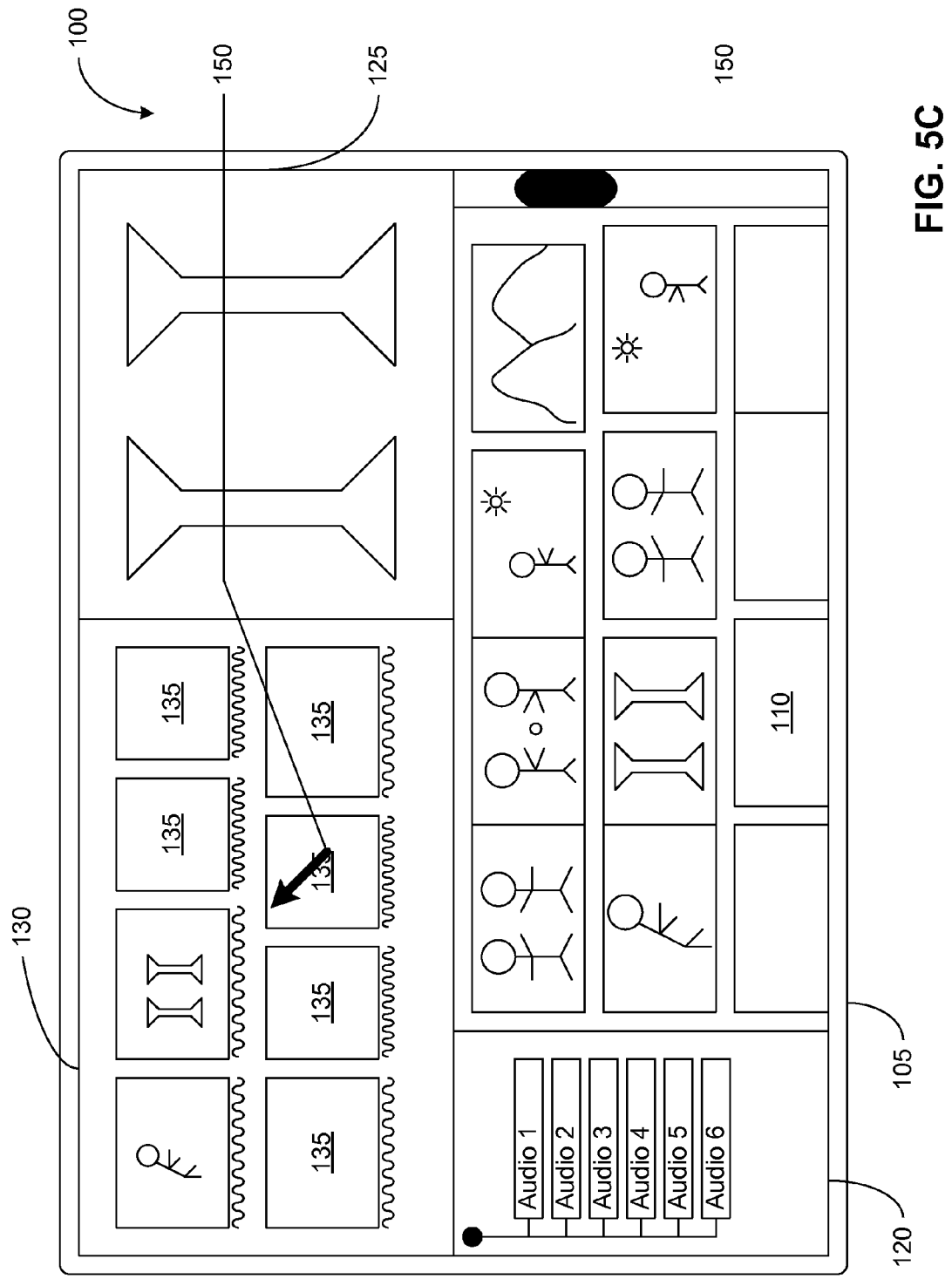

FIGS. 5A-5C are examples of a user interface for transferring portions of video content to the beats pane 130. In some implementations, the computer 115 enables a user to transfer portions of video content from any part of the user interface into the beats pane 130. In response, the computer 115 displays the transferred video content in one or more beat regions 135 in the beats pane, allows a user to play back the transferred video content, and synchronizes the transferred video content with beats in the audio content represented by the beat regions 135.

Initially, the computer 115 displays the video content in the user interface across one or more thumbnails 110 in one or more thumbnail groups. The computer 115 assigns a default video duration to each thumbnail 110 such that the portion of the video content represented by a thumbnail 110 plays for that duration. Each thumbnail 110 has a horizontal dimension that corresponds to the assigned default duration. If a duration for which the video content plays is greater than the duration assigned to the thumbnail 110, then the computer 115 distributes the video content across more than one thumbnail. While a portion of the video content that plays for the default duration is displayed in the first thumbnail 110, additional portions of the video content are displayed in adjacently placed one or more thumbnails 110. The computer 115 enables a user to change the default video duration assigned to and the horizontal dimension of a thumbnail 110.

The video content includes multiple video frames and each video frame is an image such that the multiple video frames form a collection of images that, when played back at a rate, appear as video. The computer 115 associates video frames of the video content with the thumbnail 110 representing the video content. For example, because the thumbnail 110 is displayed across multiple pixels on the display device 105, the computer 115 can associate one or more video frames in the video content with one or more pixels on the display device 105 within the region occupied by the thumbnail 110. A simple case of such association can include a thumbnail 110 having a horizontal dimension spanning 100 pixels and video content containing 100 video frames represented by the thumbnail 110. In such a scenario, the computer 115 can associate each pixel of the 100 pixels to each video frame of the 100 frames. The computer 115 can vary this association based on the number of pixels and the number of video frames. Within the rectangular bounded region of the thumbnail 110, the computer 115 can display an image of a video frame included in the video represented by the thumbnail 110. In a default state, the computer 115 can display an image corresponding to the first video frame of the multiple video frames included in the portion of video content.

To select a portion of video content to transfer to the beats pane 130, the user positions the pointer 150, e.g., the cursor, over a thumbnail 110 that represents the video content. In response to the positioning, the computer 115 displays in the thumbnail 110, the video frame associated with the position of the pointer 150. To select a starting video frame, the user can move the cursor across the thumbnail 110 until a desired video frame is displayed in the thumbnail 110.

The user selects the position in the thumbnail 110 over which the pointer 150 is displayed, e.g., by clicking the mouse, and drags the pointer 150 across the thumbnail 110. As the position of the pointer 150 in the thumbnail 110 changes, the computer 115 can update the image displayed in the thumbnail 110 to match the video frame corresponding to the pointer position. To select an ending video frame, the user moves the pointer 110 to a desired position in the thumbnail 110 and releases the pointer 150. The computer 115 can visually present this selection to the user by displaying a selection indicator 505, represented by a rectangular bounded region, in the user interface. The horizontal dimension of the selection indicator 505 can be a distance between a position of the starting video frame and a position of the ending video frame. The vertical dimension of the selection indicator 505 can be the vertical dimension of the thumbnail 110. The computer 115 can display the edges of the selection indicator 505 in a color that can be easily discerned by the user, e.g., bright red.

The user can transfer the selected portion of the video content by positioning the cursor at any location within the selection indicator 505, selecting the location with the pointer 150, e.g., by clicking the mouse, and moving the selected portion to the beats pane 130. The computer 115 can display the transfer of the selected portion using a transfer indicator 510, e.g., a rectangular bounded region, as illustrated in FIG. 5B. The computer 115 can associate the transfer indicator 510 with the pointer 150 such that the transfer indicator 510 moves wherever the user moves the pointer 150. In this manner, the user can move the selected portion of video content to the beats pane 130.

As illustrated in FIG. 5C, the computer 115 displays the portion of video content transferred to the beats pane 130 in one or more beat regions 135. When the user transfers video content to the beats pane 130 for the first time, then the computer 115 can display the transferred video content in beat regions 135 starting from the first beat region 135 in the first row adjacent to the left edge of the beats pane 130. The computer 115 can display video content that has a duration greater than the beat level of the first beat region 135 as well as subsequently transferred video content in beat regions 135 that are immediately to the right of the first beat region 135. When no beat regions 135 are available in the first row, the computer 115 can display the transferred video content in the second row and so on. Similar to the audio content, a sequence in which the transferred video content is displayed in the beat regions 135 from the left edge to the right edge of the beats pane 130 and then in rows from the top edge to the bottom edge of the beats pane 130 corresponds to the progress of time in the transferred video content from the beginning to the end.

A number of beat regions 135 in which the transferred video content is displayed depends on a beat level of a beat region 135 and a duration of the transferred video content. As described previously, the beat level is a duration of time between two beats and is represented by the horizontal dimension of a beat region 135. The beat region 135 itself represents audio frames between two consecutive beat audio frames. The portion of video content selected by the user for transfer to the beats pane 130 also has a duration. In some implementations, when the computer 115 uploads video content in the user interface, the computer 115 can determine a duration of each video clip as well as a duration between the frames included in each video clip and store these durations in a computer-readable medium. When the user selects a portion of video content to transfer to the beats pane 130, the computer 115 can determine a duration of the transferred video content by determining a duration between the first frame and last frame of the transferred video content. Subsequently, the computer 115 can compare the duration of the transferred video content to a beat level to determine a number of beat regions 135 needed to display the transferred video content.

For example, assuming that the user has transferred video content to the beats pane 130 for the first time, if the duration of the transferred content is less than the beat level of the first beat region 135, then the transferred video content can be displayed in the first beat region 135. In such scenarios, as the user moves the transfer indicator 510 over the beats pane 130, the computer 115 can change an appearance of the first beat region 130, e.g., by highlighting the beat region 130. This indicates to the user that the transferred video content spans a duration that is less than or equal to the beat level represented by the highlighted beat region 135.

Alternatively, if the duration of the transferred video content is greater than the beat level of the first beat region 135, then the computer 115 can determine a difference between a duration of the transferred content and the beat level of the first beat region 135 and compare the difference with the beat level of the second beat region 135. If the difference is less than the beat level of the second beat region 135, then the computer can determine that the entire transferred video content can be displayed in the first and second beat regions 135. The computer 115 can perform this determination until a number of beat regions 135 in which the transferred video content can be displayed is calculated. While the user transfers the transferred video content over the beats pane 130, the computer 115 can change the appearance of the calculated number of beat regions 135 to indicate the number of beat regions 135 that will be used to display the transferred content. Once the user transfers video content, the computer 115 can display a frame from the transferred video content in each beat region 135 across which the computer 115 distributes the content.

The computer 115 enables a user to transfer video content to the beats pane 130 to synchronize a frame in the transferred content with a beat audio frame in the audio content. In some implementations, to do so, the computer 115 can associate the first frame in the transferred video content with the left edge of the first beat region 135 in which the content will be displayed. Because the computer 115 has previously associated the left edge with a beat audio frame of the audio content, the first frame of the transferred audio content is associated with a beat audio frame such that, during playback, the first frame of the transferred video content plays when a beat in the audio content occurs. In addition, during playback, the computer 115 can display the playhead 145 over the video content being played back.

A simple example of the synchronization is one where the duration of the transferred video content is equal to the beat level of the beat region 135 in which the content will be displayed. The computer 115 can associate this first video frame with the left edge of the beat region to which the computer 115 has previously associated the beat audio frame. Because of this association, when the user plays back the transferred video content, at the instant that the first frame is played, a beat is heard. Then, the remainder of the transferred video content is played. In some implementations, the playback of the audio content can stop when the end of the transferred video content is reached. Alternatively, the audio content can continue to play after the playback of the transferred video content ends. In addition, as the transferred video content plays, the computer 115 can display the content in the view pane 125.

In another example, the duration of the transferred video content is greater than two and less than three beat levels and is displayed across three beat regions 135. Each beat region 135 displays a frame of the video content. The first frame of the video content is synchronized to the left edge of the first of the three beat regions 135. When the content plays back, the first video frame of the content is displayed when the beat audio frame associated with the left edge of the first beat region 135 is played. The playhead 145 is displayed initially at the left edge of the first beat region 135. As playback continues, the playhead 145 traverses the first beat region 135 and the transferred video content is presented in the view pane 125. When a duration corresponding to the beat level of the first beat region 135 expires, the playhead 145 is hidden from the first beat region 135 and displayed over the second beat region 135. Subsequently, the playhead 145 traverses the second beat region and video frames associated with the second region are played back. In this manner, video playback continues until the duration of the transferred video content expires.

Each video frame has an aspect ratio represented by a horizontal and vertical dimension. In some implementations, the horizontal dimension of the thumbnail 110 matches that of the video frame. The computer 115 can assign an aspect ratio to a video frame such that the image displayed within the video frame can be discerned by the user even though the dimensions of the image are small compared to the size of the display device 105. In some scenarios, the horizontal dimension of the beat region 135 can be smaller than the horizontal dimension of the video frame. In such scenarios, if the horizontal dimension of the video frame is altered to fit within the beat region 135, then there may be loss of image clarity. To avoid such loss, the computer 115 can increase the horizontal dimension of the beat region 135 to match that of the video frame. Even though this alters the appearance of a beat region 135, the horizontal dimension still represents a duration between two consecutive beats. Because the horizontal dimension of the beat region 135 increases and because the duration represented by the horizontal dimension does not, a speed at which the playhead 145 traverses the re-sized beat region 135 increases.

In some scenarios, the duration of a first portion of video content transferred by the user is equal to a duration between two beats in the audio content. In such scenarios, when the transferred video content is synchronized to beats in the audio content, the first video frame of the transferred video content will coincide with a beat. The last video frame is associated with an audio frame immediately prior to the beat audio frame. Thus, playback of the first portion will end just prior to a beat. In such scenarios, when a user selects a second portion of video content for synchronization to the beats, the computer 115 can synchronize the first video frame of the second portion to the beat audio frame immediately after the audio frame to which the last frame of the first portion is associated.

If, however, the duration of the first portion of video content is less than a duration between two beats, then the last video frame of the first portion will be associated with an audio frame between two beat audio frames. When the user transfers a second portion of video content for synchronization, then the first video frame of the second portion cannot be synchronized to a beat audio frame because doing so will result in unassociated audio frames that are associated with neither the first portion nor the second portion of video content. This, in turn, will cause no video frames to be played back when the unassociated audio frames are played. To avoid such scenarios, depending on a duration of the portion of video content to be transferred, the computer 115 can either add video frames to or remove video frames from the last video frame in the transferred video content.

For example, the computer 115 determines that a duration of transferred video content is m seconds, that a value that is greater than a sum of beat levels of two beat regions 135 (n seconds) but less than a sum of beat levels of three beat regions 135 (p seconds). This indicates that the transferred video content will be displayed across three beat regions 135. Also, this indicates that the last frame of the transferred video content will be associated with an audio frame between the beat audio frames of the third of the three beat regions 135. To avoid this scenario, the computer 115 determines a duration between the sum of the beat levels of the three beat regions 135 (p seconds) and that of the transferred video content (m seconds). The computer 115 adds to the transferred video content (p−m) seconds of video content so that the transferred video content ends immediately before a beat. The computer 115 selects those frames of video that appear after the transferred video content in the originally uploaded video content are selected for adding.

Alternatively, the computer 115 can remove video frames from the transferred video content so that the content ends immediately before a beat. To do so, the computer 115 can determine a difference between a duration of the transferred video content (m seconds) and the sum of beat levels of two beat regions 135 (n seconds). The computer 115 can remove (m−n) seconds of video frames from the end of the transferred video content. This can result in the transferred video content being displayed within two beat regions 135 instead of three. In some implementations, the computer 115 can determine adding or removing video frames based on a comparison of a difference between the duration and the sum of beat levels to a threshold. For example, if the difference in duration is less than 20% of the beat level, then the computer 115 can remove video frames to round-down the transferred content to the immediately preceding beat audio frame. If not, then the computer 115 can add video frames to round-up the transferred content to the immediately following beat audio frame.

In the example user interface illustrated in FIG. 5C, the beat region 135 adjacent to the left edge of the beats pane 130 in the first row of beat regions may not represent a beat. As described previously, this can be because the audio content that the computer 115 provided to the beat detection system 305 did not start with a beat. So, in FIG. 5C, the first beat region 135 represents a portion of the audio content in which no beat was detected by the beat detection system 305. The horizontal dimension of the first beat region 135 represents the duration for which the portion of audio with no beat lasts and includes all frames between the starting audio frame of the audio content to the audio frame immediately prior to the first beat audio frame. The first beat in the audio content is represented by the second beat region 135 in the first row. In such scenarios, determinations for synchronization, rounding-up, rounding-down, and the like are performed with respect to the second beat region 135 because it is the left edge of the second beat region 135 to which the first beat in the audio is associated.

Figure 6A:
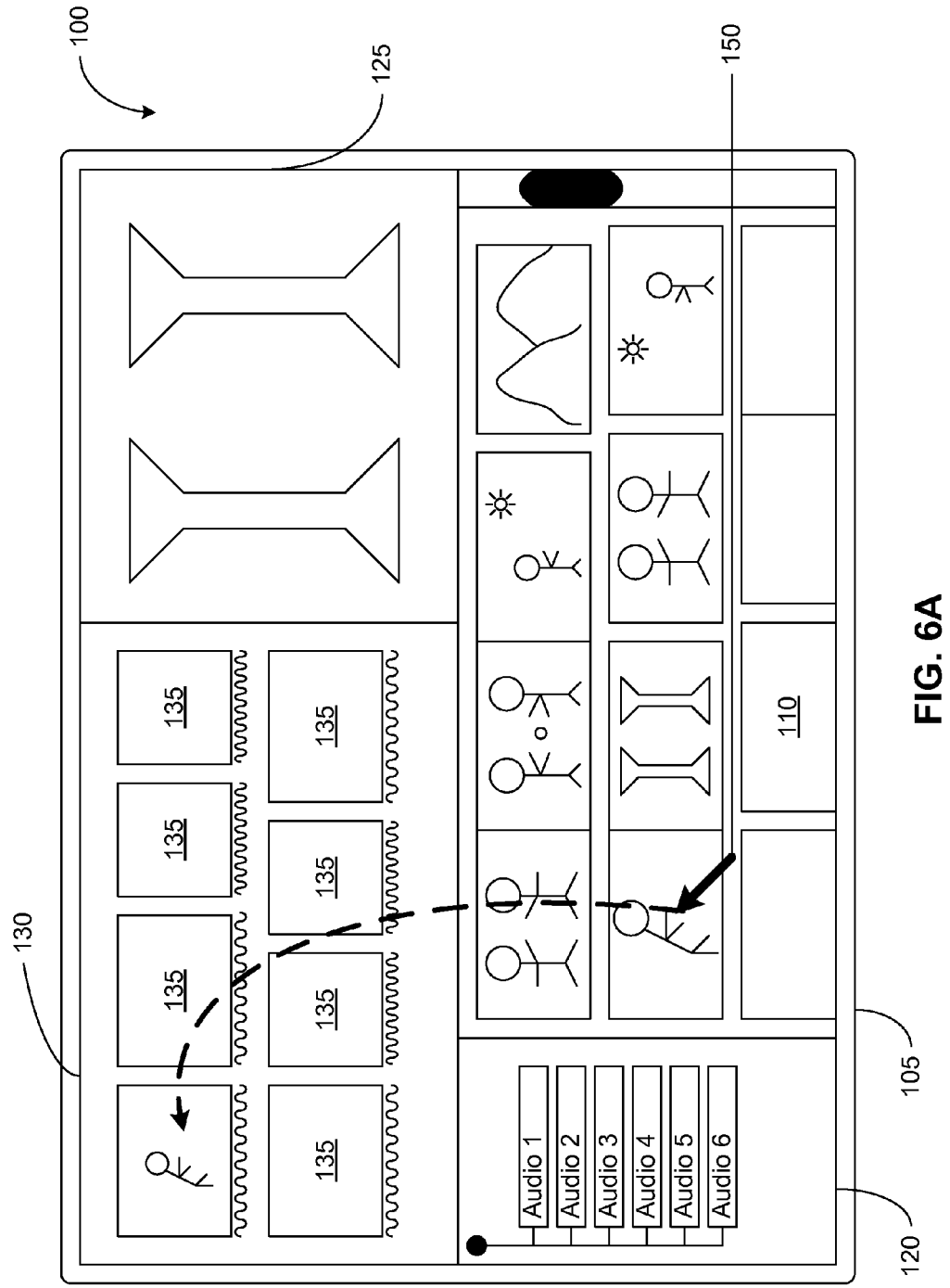
FIGS. 6A and 6B are examples of a user interface illustrating single-step synchronization of video to beats.
Figure 6B:
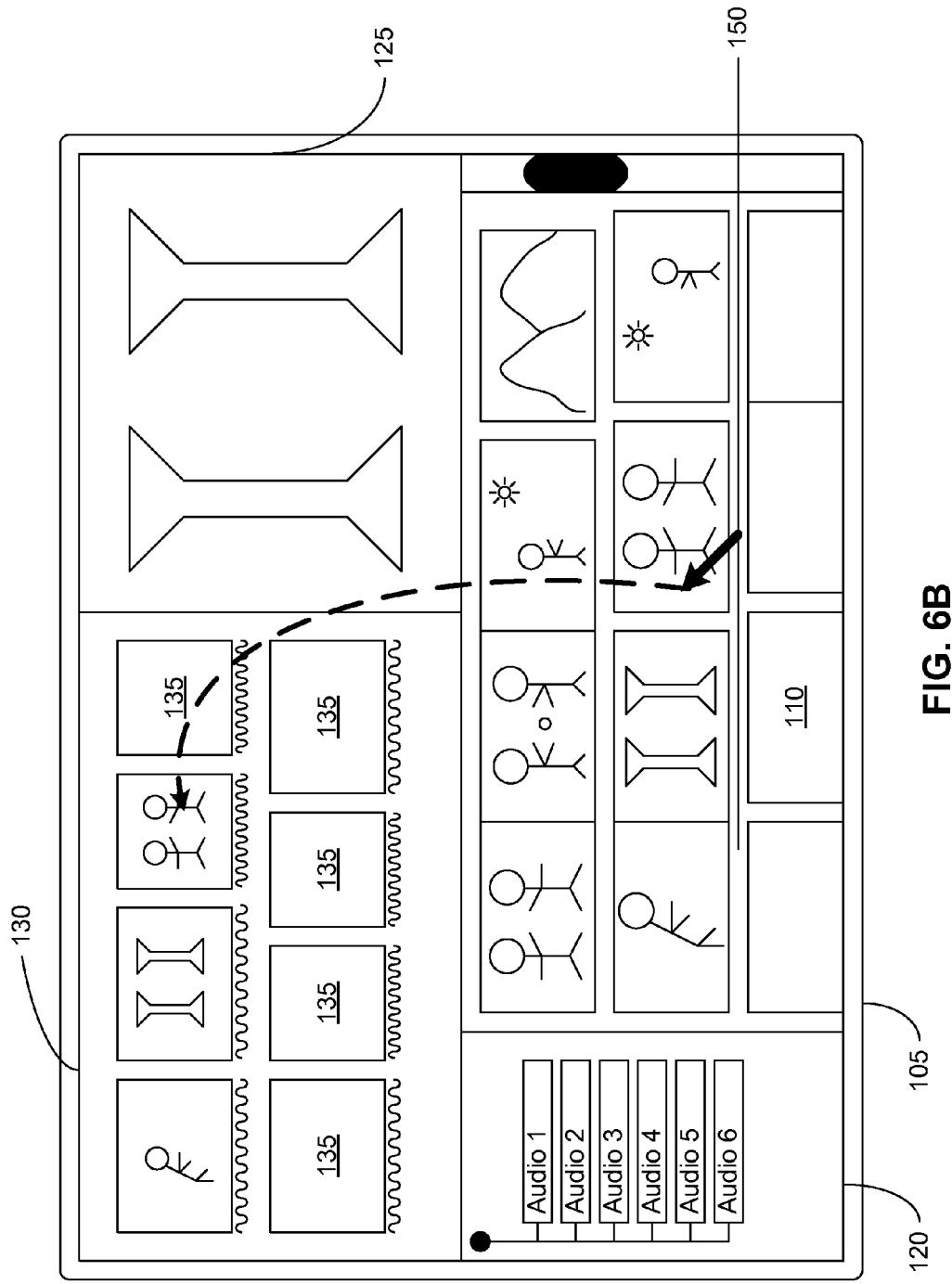

FIGS. 6A and 6B are examples of a user interface illustrating single-step synchronization of video to beats. In some implementations, to enable users to transfer video content to the beats pane 130 instantaneously, the computer 115 can enable a single-step selection mode. In this mode, the computer 115 can replace the selection process of clicking and dragging the pointer 150 with a one-step process, e.g., one that includes only clicking. In some implementations, the computer 115 can detect a selection of a video frame displayed in a thumbnail 110. For example, the user can position the pointer 150, e.g., the mouse cursor, in a thumbnail 110 causing the video frame associated with the position to be displayed in the display device 105. Subsequently, the user can select the displayed frame by clicking the mouse. This represents a single-step selection where the user has performed clicked the mouse once instead of positioning the pointer 150 at a position, and clicking and dragging the mouse to select video content. In an alternative selection process, the user can position the pointer 150 at a location and select a video frame by pressing a key on a keyboard.

In some implementations, in response to the single-step selection, the computer 115 can select multiple video frames including the selected video frame, transfer the selected multiple video frames to the beats pane 130, and display the transferred video frames in one beat region 135. A duration of the video frames selected and transferred by the computer 115 is equal to a beat level of a first available beat region 135 in the beats pane 130 to which the video frames can be transferred. For example, initially, the left-most beat region 135 in the first row of the beats pane 130 is not associated with any video content (FIG. 6A). When the user clicks the position of the pointer 150 in the thumbnail 110, the computer 115 treats the video frame associated with the position of the pointer 150 as the first video frame in the selection. Then, the computer 115 determines the beat level of the first beat region 135. Including the first video frame that the user selected, the computer 115 selects additional video frames such that a duration of all the video frames selected equals the beat level of the first beat region 135. Subsequently, the computer 115 associates the selected video frames with the audio frames represented by the first beat region, synchronizes the first video frame to the beat audio frame represented by the left edge of the first beat region 135, and displays the image associated with the first video frame in the first beat region 135.

To make further transfers, the user positions the pointer 150 at other positions within the same or different thumbnails 110 and performs the single-step selection operation. In response, the computer 115 continues to transfer video content having a duration equaling a beat level of each subsequently available beat region 135. In some implementations, in response to the single-step selection, the computer 115 can display transferred video content in more than one beat region 135, as illustrated in FIG. 6B. For example, in response to the single-step selection, the computer 115 can identify a beat level associated with each of the first three beat regions 135 in the first row as well as a sum of the beat levels. Including the selected video frame as the first video frame, the computer 115 can select multiple video frames having a duration equal to the sum of the beat levels of the three beat regions 135. Subsequently, the computer 115 can associate the selected multiple video frames with the three beat regions 135, synchronize the first video frame with the beat audio frame represented by the left edge of the left-most beat region 135, and display a video frame in each of the three beat regions 135.

In some implementations, the computer 115 can allow the user to pre-set a duration of video frames that can be selected using the single-step selection operation. The pre-set duration can correspond to a beat level representing a duration between two beats. In implementations where the beat levels across multiple beat regions 135 are uniform, the pre-set duration can be a constant value and can be either the beat level or a multiple of the beat level associated with each beat region 135. In operation, after uploading the video content in the user interface, the user moves the pointer 150 to different positions in one or more thumbnails 110. At each position, the user clicks the mouse, and in response, a number of video frames corresponding to the pre-set beat level duration are associated to each beat region 135. In addition, the first video frame of the transferred video frames is synchronized with the beat audio frame associated with the left edge of the beat region 135. The pre-set duration that corresponds to a beat level can be altered by the user, e.g., as illustrated in FIG. 7.

Figure 7:
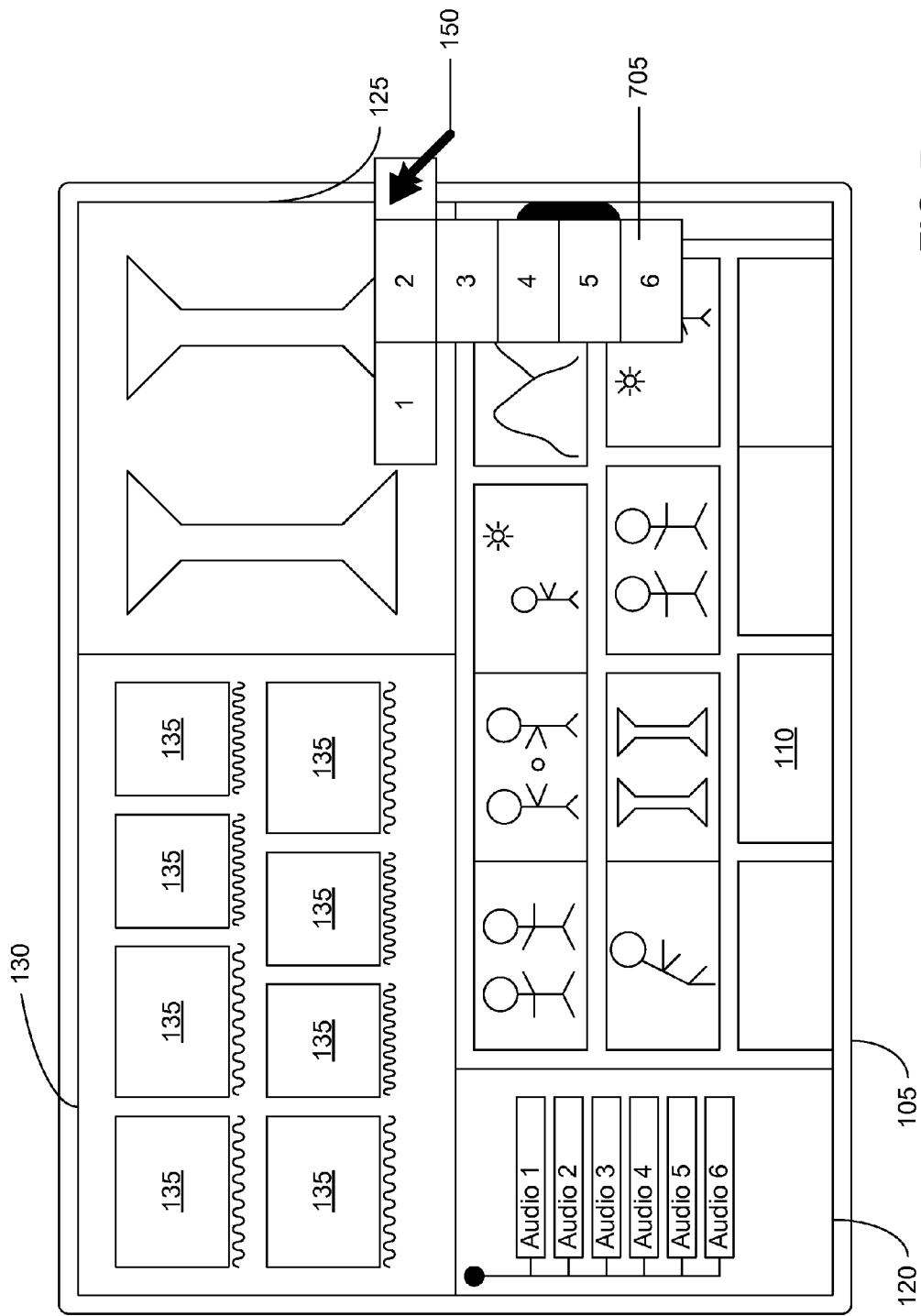
FIG. 7 is an example of a user interface including a beat alteration control 705 to alter beat levels during editing.

FIG. 7 is an example of a user interface including a beat alteration control 705 to alter beat levels during editing. During editing, the user identifies multiple video frames, each of which the user wishes to synchronize with a corresponding beat in the audio content. In addition, the user wishes to transfer to the beats pane 130, a number of video frames starting with one of the selected video frames. In some scenarios, the user may wish to change the number of video frames to a duration different from the pre-set duration corresponding to the pre-set beat level. The computer 115 can display a beat alteration control 705 which can display multiple values, each value corresponding to a beat level. When a user selects one of the displayed values, then the computer 115 replaces the value of the pre-set duration with the value selected from the beat alteration control 705.

Subsequently, when the user performs a single-step selection operation described previously, the number of video frames that are transferred to the beats pane 130 corresponds, in duration, to the beat level value that the user selected from the beat alteration control 705. The computer 115 also performs the operations of synchronizing the first of the selected video frames to a beat audio frame and associating the left edge of the beat region 135 representing the beat audio frame to the selected video frame. Now, if the user wishes to change the number of video frames to last a duration different from the value selected from the beat alteration control 705, then the user can select a new value for the beat level from the beat alteration control 705.

In some implementations, the computer 115 can display the beat alteration control 705 as three selectable rectangular bounded regions displayed adjacent to each other. The right-most rectangular region can include a downward pointing arrow, the left-most rectangular region can display a number, e.g., "1," and the rectangular region in the middle can display another number, e.g., "2." The numbers, "1" and "2," represent beat levels. Each rectangular region is selectable such that selecting a rectangular region causes the computer 115 to change the value of the pre-set duration of video frames to be selected to equal the value in the selected rectangular region. In addition, when the user selects the rectangular region illustrating the downward pointing arrow, e.g., using the pointer 150, then a column of rectangular regions is displayed below the rectangular region in the middle. Each element in the column lists a number, e.g., "3," "4," "5," "6," and the like, each of which corresponds to a pre-set duration. The user can alter the pre-set duration to be a desired beat level by selecting the element in the column that displays the desired value.

Thus, the left-most rectangular region in the beat alteration pane 705 is a dedicated element that allows a user to set the pre-set duration to 1 beat level. In alternative implementations, the pre-set value displayed by this dedicated element can be any value, e.g., a value that the user that the user regularly assigns to the pre-set duration. When the user selects the downward pointing arrow in the right-most rectangular region, and then selects a value from the column, e.g., "5," then the computer 115 updates the middle rectangular region to display "5." Further, the computer 115 can change an appearance of, e.g., highlight, the rectangular region that the user has selected while dimming the appearance of the other rectangular regions in the beat alteration pane 705. In this manner, the computer 115 allows a user to toggle between the left and middle rectangular regions in the beat alteration pane 705. As described previously, for each instance that the user performs the single-step selection operation, a portion of video content is displayed across one or more beat regions 135. In some implementations, the representation of the audio content in the beats pane 130 can be different from the beat regions 135 described previously.

Figure 8:
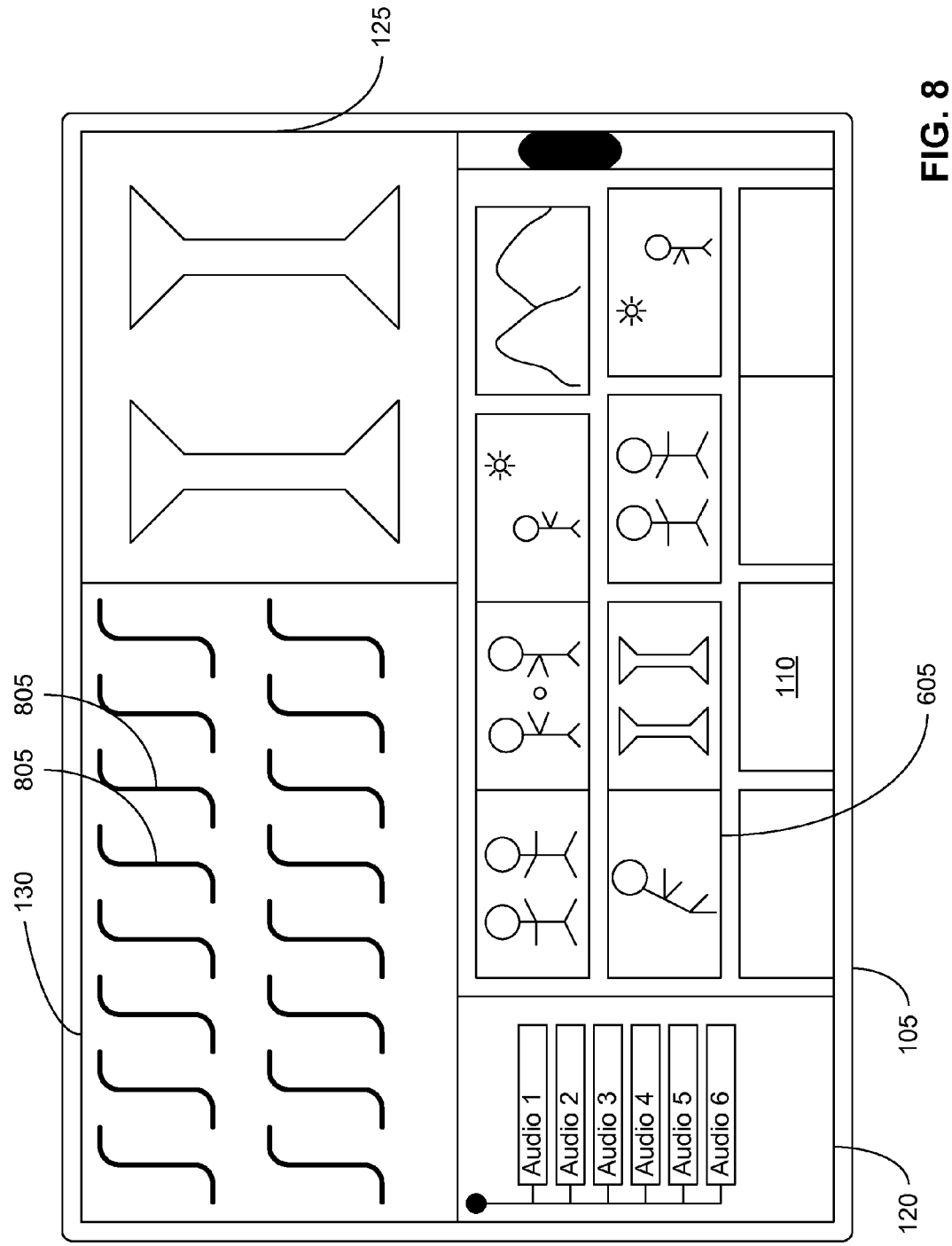
FIG. 8 is an example of a user interface illustrating beats as linear illustrations.

FIG. 8 is an example of a user interface illustrating beats as linear illustrations 805. In some implementations, instead of representing the audio content as multiple bounded regions 135, the audio content can be represented by multiple linear illustrations 805. The vertical portion of each linear illustration 805 represents a beat audio frame. The horizontal distance between two linear illustrations 805 represents the beat level. The manner in which video content is transferred to and displayed in the beats pane 130 as well as the manner in which a video frame is synchronized to a beat audio frame are similar to that described previously.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a random or serial access memory device, or a combination of one or more of them.

The term "processing device" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other module suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the specification or of what may be claimed, but rather as descriptions of features specific to particular implementations of the specification. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

While some implementations have been described, other implementations are possible. For example, the computer 115 can display a snap button in the user interface. When the snap button is turned on and the user transfers the video content to the beats pane 130 to synchronize to the first frame of the video content to a beat audio frame represented by a left edge of the beat region 130, the user can release the transfer indicator 610 near the left edge of the beat region 135 without positioning the left edge of the transfer indicator 610 over the left edge of the beat region 135. As long as the user positions the left edge of the transfer indicator 610 near a left edge of a beat region 135, the computer 610 moves the left edge of the transfer indicator 610 over the left edge of beat region 135. In this manner, the computer 115 provides an appearance of the first frame of the transferred video content being snapped to the beat audio frame. To do so, the computer 115 can determine a position of the left edge of the transfer indicator 610 with respect to the left edge of the beat region 135. Subsequently, the computer 115 can identify the audio frame associated with the position of the left edge of the transfer indicator 610. Then, the computer 115 can identify the beat audio frame that is nearest to the identified audio frame. Finally, the computer 115 can display the left edge of the transfer indicator 610 over the identified beat audio frame. Alternatively, when the snap button is turned off, the computer 610 positions the left edge of the transfer indicator at the position in the beat region 135 where the user releases the transfer indicator 610.

Some audio content includes only one beat, e.g., a sound of a cymbal that is heard periodically. Other audio content includes more than one beat, e.g., a sound of a cymbal and that of a bass drum that occur simultaneously and are heard periodically. In implementations where such audio content is visually represented in the beats pane 130, the information about the beats that is received from the beat detection system 305 can identify both types of beats. For example, because the beat detection system 305 identifies the cymbal as a high pitch beat and the bass drum as a low pitch beat. When the computer 115 receives this information, the compute 115 can visually represent both types of beats in the beats pane 130. For example, the computer 115 splits a beat region 135 into two rectangular regions having a same horizontal dimension representing both types of beats. The computer 115 displays one of the two rectangular regions above the other to indicate that the upper rectangular region corresponds to the high pitch beat, namely, the cymbal, and the lower rectangular region corresponds to the low pitch beat, namely, the bass drum.

In some implementations, the computer 115 can display any portion of transferred video content in any beat region 135 regardless of the temporal arrangement of the beat region 135 associated with the audio content or the thumbnail 110 in which the video content is displayed. Subsequent to associating transferred video content to audio content represented in the beats pane 135 and synchronizing beat audio frames to video frames, the computer 115 can store the video frames and the associated audio frames as a project in a format, e.g., the MPEG format, the MOV format, and the like. The computer 115 can store the project in one or more computer-readable media, thereby providing the stored project for transfer to an external device. In some implementations, the user interface can be stored on a remote server operatively coupled to the computer 115 via one or more networks, e.g., the Internet. To manage audio and video content, the user can upload content to the server, employ the content management software application, and edit the audio and video content. The beat detection system 305 can also be operatively coupled to the server via the Internet or any other network.

What is claimed is:

1. A computer-implemented method comprising:
    displaying a first bounded region representing a plurality of video frames in a first area of a user interface;
    displaying a second bounded region representing a plurality of audio frames in a second area of the user interface, wherein the plurality of audio frames represent audio content that includes two beat audio frames corresponding to two consecutive beats in the audio content, and wherein a left edge and a right edge of the second bounded region represent the two consecutive beats;
    receiving input to associate one or more video frames of the plurality of video frames with the plurality of audio frames, the input comprising a positioning of a cursor over a portion of the first bounded region and over a portion of the second bounded region; and
    in response to the received input, synchronizing a first video frame of the one or more video frames with a first beat audio frame associated with the second bounded region.

2. The method of claim 1, wherein the first beat audio frame is included in the plurality of audio frames such that in response to a playback input, the first video frame is displayed in the user interface when the first beat audio frame is played.

3. The method of claim 1, further comprising:
    providing the plurality of audio frames to a beat detection system configured to identify beat audio frames; and
    receiving the two beat audio frames from the beat detection system.

4. The method of claim 1, wherein a video frame of the plurality of video frames is associated with a first position of a plurality of first positions that collectively represent a horizontal dimension of the first bounded region, and wherein an audio frame of the plurality of audio frames is associated with a second position of a plurality of second positions that collectively represent a horizontal dimension of the second bounded region.

5. The method of claim 4, wherein positioning the cursor over a first portion of the first bounded region corresponds to a selection of a video frame associated with that position, and positioning the cursor over a second portion of the second bounded region corresponds to a selection of an audio frame associated with the second position.

6. The computer-readable medium of claim 5, the operations further comprising:
    receiving playback input to play the video content to which the audio content is synchronized; and
    in response to receiving the playback input, playing back the audio content and the video content, the playing back comprising displaying the video content within the bounded region while simultaneously playing the synchronized audio content.

7. The computer-readable medium of claim 6, the operations further comprising:
    while playing back the audio content and the video content, displaying a vertical line spanning a vertical dimension of the bounded region over the video content; and
    traversing the vertical line across a horizontal dimension of the bounded region such that when the audio content represented by the bounded region ends, the vertical line reaches a right edge of the bounded region.

8. The computer-readable medium of claim 5, the operations further comprising:
    providing the plurality of audio frames to a beat detection system configured to identify the two beat audio frames; and
    receiving the two beat audio frames from the beat detection system.

9. A computer-readable medium, tangibly embodying a computer program product which, when executed by one or more computers performs operations comprising:
    displaying a bounded region representing audio content including a plurality of audio frames including two beat audio frames that represent two consecutive beats in the audio content, the bounded region associated with a beat duration between the two beat audio frames, wherein a left edge and a right edge of the bounded region represent the two consecutive beats;
    receiving a plurality of video frames representing video content to associate with the plurality of audio frames, wherein a video duration between a first video frame and a last video frame of the plurality of video frames represents a duration of the video content;
    associating a first video frame in the video content to a first beat audio frame of the two beat audio frames to synchronize the video content and the audio content;
    determining that a duration of the video content is less than or equal to the beat duration; and
    based on the determining, displaying a video frame of the plurality of video frames within the bounded region.

10. A computer-implemented method comprising:
    determining beat audio frames included in an audio content, a beat audio frame being an audio frame that includes a beat, wherein a beat is a pulse included in the audio content;
    displaying a beat region in a first area of a user interface, the beat region being a bounded region of the user interface providing a visual representation of a fraction of audio frames in the audio content, wherein a left edge and a right edge of the beat region represent two consecutive beats in the audio content and a horizontal distance between the left and right edges represents a time duration between two beat audio frames corresponding to the two consecutive beats;
    displaying a thumbnail in a second area of the user interface, the thumbnail being a visual representation of a fraction of video frames included in a video content;
    receiving an user input for associating one or more video frames represented by a portion of the thumbnail with one or more audio frames represented by a portion of the beat region, the input comprising a selection of the portion of the thumbnail and a selection of the portion of the beat region; and
    responsive to receiving the user input, synchronizing the one or more video frames represented by the selected portion of the thumbnail with the one or more audio frames represented by the selected portion of beat region such that during a playback of the one or more video frames represented by the selected portion of the thumbnail, the one or more audio frames represented by the selected portion of beat region are also played back simultaneously.

* * * * *